United States Patent [19]

Devening

[11] Patent Number: 5,513,887
[45] Date of Patent: May 7, 1996

[54] CYLINDER LIFTER

[76] Inventor: Charles K. Devening, 11809 Vauk Valley La., Cincinnati, Ohio 45249

[21] Appl. No.: 449,960

[22] Filed: May 25, 1995

[51] Int. Cl.⁶ ........................................................ B66C 1/16
[52] U.S. Cl. ......................................... 294/67.22; 294/67.1
[58] Field of Search ........................... 294/27.1, 29, 31.2, 294/32, 67.1–67.5, 68.1, 68.21, 90, 91, 142, 165; 220/400, 401; 248/129, 143; 280/47.17, 47.24, 47.26, 47.27, 79.5; 414/444, 447–449, 453, 456, 457

[56] References Cited

U.S. PATENT DOCUMENTS

| | | | |
|---|---|---|---|
| 1,250,602 | 12/1917 | Lobdell | 294/67.22 |
| 1,815,825 | 7/1931 | Bates | 248/129 |
| 1,974,675 | 9/1934 | Hoedl | 248/129 |
| 2,104,130 | 1/1938 | Lewis | 294/67.1 X |
| 2,797,832 | 7/1957 | Weinmann | 414/456 |
| 2,910,304 | 10/1959 | Caylor | 248/143 X |
| 3,064,991 | 11/1962 | Huthsing | 280/47.24 |
| 4,294,481 | 10/1981 | Pearl | 294/31.2 X |
| 4,424,999 | 1/1984 | Commins | 294/142 |
| 4,486,044 | 12/1984 | Gordon et al. | 294/31.2 |
| 5,181,756 | 1/1993 | Yurick | 294/67.1 X |

*Primary Examiner*—Johnny D. Cherry
*Attorney, Agent, or Firm*—Wood, Herron & Evans

[57] ABSTRACT

A cylinder lifter is disclosed that provides a safe and easy way to load gas-filled cylinders into a lifter and to transport the cylinders vertically overhead. The lifter has a flat bottom plate to facilitate the loading of a cylinder thereon. Extending vertically from the flat bottom plate is a semicircular frame that encompasses the cylinder when resting on the flat bottom plate. The lifter has two releasable locking devices to secure the cylinder in the lifter. To accommodate transportation of the loaded lifter overhead, an engageable lift bar extends from the top of the frame.

8 Claims, 1 Drawing Sheet

CYLINDER LIFTER

FIELD OF THE INVENTION

This invention relates generally to a cylinder lifter, and more particularly to a cylinder lifter that provides a safe and easy way to load gas-filled pressurized cylinders into a lifter and to transport the cylinders vertically overhead.

BACKGROUND OF THE INVENTION

Those in the welding industry particularly and other industries such as plumbing and heating generally, often use bottled gases in the performance of their occupation. These gases are typically stored in pressurized cylinders which can sometimes exceed a weight of 200 pounds, making them difficult and dangerous to lift and to transport, particularly to lift and transport overhead by means of an overhead crane.

Various cylinder lifters are known in the art. For example, U.S. Pat. No. 2,104,130 discloses a cage adapted to support and retain a pressurized, gas-filled tank while it is carried in a vertical orientation by a crane hook. To prevent the tank from slipping out of the cage while being transported, this cage has a locking ring slidable on the cage and adapted to slip over the neck of the tank and hold the top of the tank in the cage. The bottom of the tank is retained in the cage by a separate semi-cylindrical ring. There is a difficulty with this particular tank holding cage because in order to load the tank into the cage, the full weight of the tank must be vertically lifted and the tank physically inserted into the cage.

Similarly, U.S. Pat. Nos. 4,486,044 and 4,294,481 both disclose devices for supporting and transporting gas-filled cylinders while retained in a cage. Like the '130 patent, those cylinders are loaded in the cage only by vertically lifting and physically inserting the cylinders therein, a definite disadvantage.

U.S. Pat. No. 5,181,756 discloses a hoisting cage for hoisting concrete and building material, having one open side to the cage. This hoisting cage has no way of safely securing its contents or preventing them from falling out of the open side, except for the mere use of a chain extending across the open side.

It will be appreciated that it is desirable for a cylinder lifter to be able to secure the cylinder safely within its cage, reducing the chance of the cylinder falling out while being transported. A falling, gas-filled pressurized cylinder can be very dangerous to those below.

It will also be appreciated that it is desirable for a cylinder lifter to be able to receive a cylinder without a person or machine having to physically vertically lift and insert the cylinder into the cage of the lifter. The gas-filled pressurized cylinders are quite heavy and, if lifted manually, may result in bodily injury to a person who lifts the gas-filled cylinders into the cage of a cylinder lifter. And if the cylinder is lifted and inserted mechanically into the lifter, additional machinery is required resulting in additional equipment costs.

Accordingly, it has been one objective of the present invention to provide an easy-to-use cylinder receiver and lifter for receiving a cylinder without the cylinder having to be vertically lifted and manually inserted into the cylinder lifter.

Another objective of the present invention has been to provide an improved and easy to use cylinder lifter that is relatively inexpensive and yet which secures the gas-filled cylinder in a holder which may safely be transported by an overhead crane without any danger of the cylinder falling out of the holder during transportation or movement by the crane.

SUMMARY OF THE INVENTION

To these ends, the present invention is directed to a generally semi-cylindrical cylinder lifter frame for receiving and lifting a cylinder. The lifter frame has a flat bottom plate onto which a cylinder may be easily placed by tipping the top of the vertically oriented cylinder away from the frame and sliding the flat bottom plate under the cylinder. When the cylinder is then returned to a vertical orientation, it is contained within the semi-cylindrical frame and supported on the top of the bottom plate. To secure the cylinder in the lifter frame, the lifter has a first releasable locking device adjacent to the top end of the lifter. This first locking device is a vertically slidable locking plate movable on the frame of the lifter and adapted to fit over and lock an end portion of the cylinder within the lifter frame.

To further secure the cylinder in the lifter frame, the lifter has a second releasable locking device positioned generally about midway between the bottom plate and the top end of the lifter. This second locking device is extendable across the open side of the frame to further secure and lock the cylinder within the lifter frame. In the preferred embodiment, this second locking device is a flexible chain.

A lift bar extends vertically from the top of the lifter frame. This lift bar is preferably generally shaped as an inverted "V" or "U" to facilitate lifting via an overhead crane hook.

In the use of this cylinder lifter, a person using the lifter first tips the top of a vertically oriented cylinder away from the top of the lifter and moves the bottom plate of the lifter frame beneath the bottom of a tilted cylinder. That person then pulls the top of the cylinder back into a vertical orientation and through the open side of the frame so that the cylinder is contained within the semi-cylindrical frame. The cylinder located within the lifter frame is then secured by sliding the first locking device plate downwardly over the frame of the cage and over the upper end or neck of the cylinder. The cylinder is then further secured within the frame by extending and securing the second locking device in the form of a chain across the open side of the lifter. Thereby, the cylinder is secured within the frame so that the lifter with the cylinder contained therein may be safely lifted by engagement of a crane hook with the top lift bar of the frame.

BRIEF DESCRIPTION OF THE DRAWINGS

These and other objectives and advantages of the invention of the application will become more readily apparent from the following detailed description of the drawings in which.

DETAILED DESCRIPTION OF THE INVENTION

Figure 1:
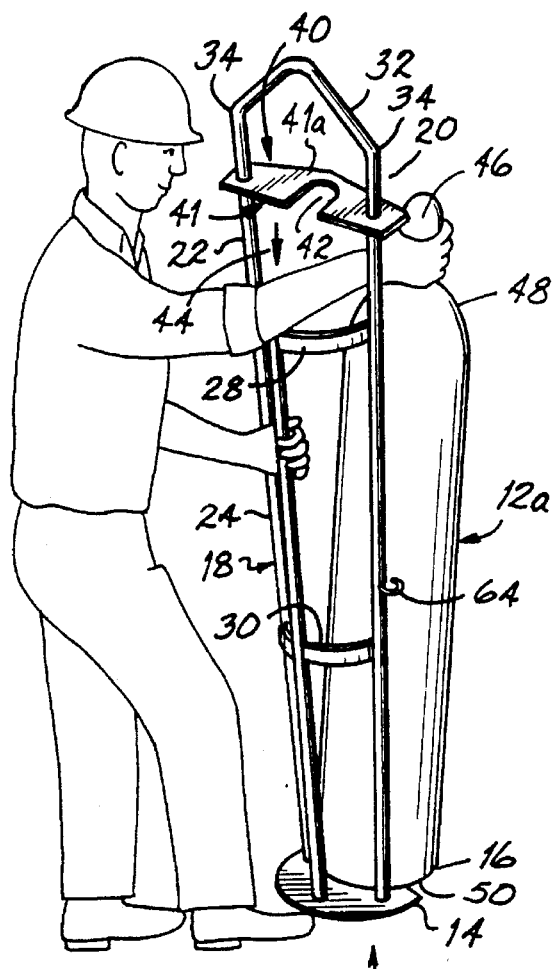
FIG. 1 is a rear perspective view of a preferred embodiment of a semi-cylindrical vertical cylinder lifter receiving a cylinder.

With reference to FIG. 1, there is shown the new cylinder lifter 10 of this invention as it is used to receive a cylinder 12a. The lifter 10 is generally comprised of a semi-cylindrical metal cage or frame 18, a bottom plate 14, a first upper releasable locking device 40, and a second lower locking device 52. The flat bottom plate 14 is generally semi-circular in shape in conformance with the circular shape of the horizontal, bottom surface 16 of cylinder 12a. However, plate 14 may be other shapes such as square. The flat plate bottom 14 enables the lifter 10 to independently stand in an upright position. Further, because the bottom plate 14 is flat, it is suitably adapted to receive the cylinder 12a thereon such that cylinder 12a can independently stand in an upright position on the flat bottom plate 14.

The frame 18 extends vertically from the bottom plate 14 of lifter 10. It is generally semi-cylindrical in shape such that there is an open side 20 for receiving the cylinder 12a therethrough. The frame 18 is generally comprised of three vertical rods 22, 24, 26 arranged in a semi-cylindrical manner and extending upwardly from the bottom plate 14. The frame 18 further comprises two spaced horizontal semi-cylindrical bands 28, 30 connected as by welding to the rods 22, 24, 26. A lift bar 32 in the shape of an inverted V or U (hereinafter referred to as V shaped) extends vertically from the upper end 34 of the frame 18.

To secure the cylinder 12a within the semi-cylindrical frame 18, there is a first releasable locking device 40 in the form of a flat lock plate 41 vertically slidable over the rods 22, 26 of the frame 18. The flat plate 41 is generally a rectangularly shaped plate with a rearwardly facing semi-circular opening 42 for receiving the neck 46 of cylinder 12a. This first locking device 40 is slidable down the frame 18 in direction of the arrow 44 over the neck 46 of the cylinder 12a when the cylinder 12a is contained completely within the lifter 10 to lock the cylinder 12a in the lifter 10. As so constructed, the forward portion 41a of the flat lock plate 41 prevents the cylinder 12a from moving forwardly out of the lifter 10 and the rear rod 24, and bands 28, 30 of the frame 18 prevent the cylinder from moving rearwardly relative to the lifter 10. The lock plate 41 of the locking device 40 will be retained by gravity in the lower position located over the neck 46 of the cylinder 12a so long as the lifter 10 and cylinder 12a remain in a vertical orientation. To release the cylinder 12a from its locked position with the lifter 10, the lock plate 41 must be physically lifted above the level of the top 46 of the cylinder 12a such that the top 46 of the cylinder 12a may be tipped out of the frame 18 and the bottom plate 14 of the lifter 10 pulled from under the cylinder 12a.

In the use of the lifter 10, the open side 20 of the lifter 10 is placed adjacent to the cylinder 12a and the top 46 of the cylinder 12a is tilted away from the open side 20. Once tilted, the lifter 10 is moved toward the cylinder 12a so that the bottom plate 14 is slid under the bottom surface 16 of the tilted cylinder 12a.

Once the bottom plate 14 is beneath the bottom surface 16 of the cylinder 12a, cylinder 12a is returned to an upright position such that the cylinder 12a passes through the open side 20 of the lifter 10 and the bottom surface 16 of the cylinder 12a rests on the top of the flat bottom plate 14. The cylinder 12a is then encompassed or surrounded on the rear sides by the frame 18 in a semi-circular fashion. Thus, the cylinder 12 is loaded into the lifter 10 without the cylinder 12a having to be physically lifted or slid through the open side 20 and placed within the semi-cylindrical frame 18.

Figure 2:
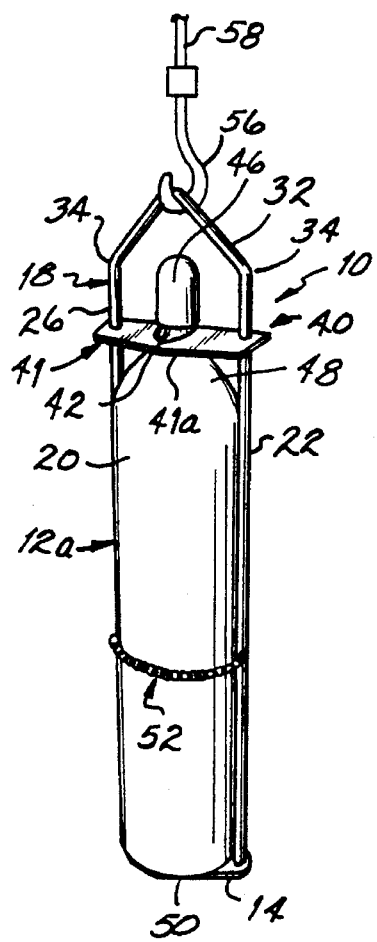
FIG. 2 is a perspective front view of the cylinder lifter of FIG. 1 containing a cylinder being lifted vertically.

As shown in FIG. 2, the lifter 10 has a second releasable locking device 52 generally about midway between the bottom plate 14 and the top end 34 of the frame 18. This second releasable locking device 52 preferably is in the form of a flexible metal link chain or strap which is permanently attached to rod 22 and releasably attachable to rod 26 of the frame 18. This second releasable locking device 52 further secures the cylinder 12a in the lifter 10 so as to prevent it from inadvertently falling from the lifter 10 as the cylinder 12a contained within the lifter 10 is lifted by a crane hook 56 engageable with the lifter bar 32 and is swung from a cable 58 of a movable lifting crane (not shown).

Figure 3:
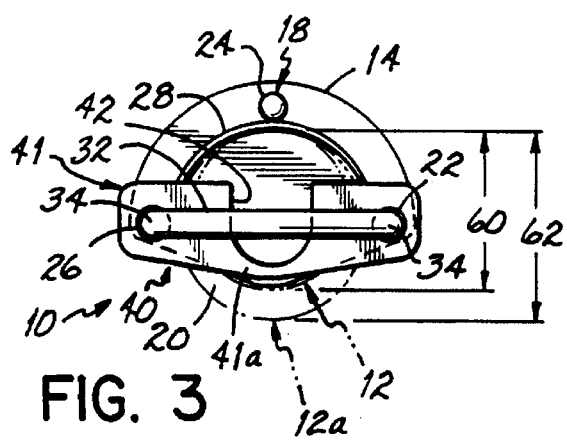
FIG. 3 is a top view of the cylinder lifter of FIG. 1.

As illustrated by phantom lines in FIG. 3, lifter 10 is capable of receiving and transporting cylinders 12, 12a of various sizes. For example, cylinder 12 may be 54 inches in height with a 9 inch diameter 60, or the cylinder 12a may be 48 inches in height with a 12 inch diameter 62. In both instances, the same first releasable locking device 40 is freely slidable up and down the frame 18 to adjust to the height of the cylinder 12, 12a accordingly. Similarly, cylinders 12, 12a of different diameters 60, 62 may be accommodated and securely locked in the frame 18 by the flexible second locking device 52, the chain (See FIG. 2) by simply securing different links of the chain to a link hook 64 (See FIG. 1) of the rod 26 of the frame 18.

As will now by readily apparent to persons skilled in this art, the lifter 10 described hereinabove has numerous advantages over lifters which have preceded it. Specifically, it is much easier to use than prior lifters because of the ease with which cylinders may be inserted into and removed from the lifter without having to be physically picked up and inserted therein. Additionally, this lifter is more secure than lifters which have preceded it and does not present a hazard when a cylinder contained in this lifter is picked up by a crane and caused by movement of the crane to swing wildly from a cable by means of which the lifter is attached to the moving crane.

While I have described only a single preferred embodiment of my invention, persons skilled in this art will appreciate changes and modifications which may be made without departing from the spirit of my invention. Therefore, I do not intend to be limited except by the following claims.

I claim:

1. A generally semi-cylindrical vertical cylinder lifter for lifting a cylinder, said lifter comprising:

a flat bottom plate;

a frame extending vertically from said bottom plate, said frame being generally semi-cylindrical in shape and having one open side adapted to receive a cylinder;

a first releasable locking device adjacent a top end of said frame, said locking device being vertically slidable over said frame and adapted to fit over an end portion of a cylinder when the cylinder is located in said lifter;

a second releasable locking device positioned generally about mid-way between the bottom plate and the top end of said frame, said second locking device being adapted to secure a cylinder within said lifter by extending across the open side of said frame; and a lift bar extending vertically from the top end of said lifter.

2. The lifter of claim 1 wherein said flat bottom plate is generally semi-circular in shape.

3. The lifter of claim 1 wherein said second locking device is a flexible chain or strap.

4. The lifter of claim 1 wherein said lift bar has a generally inverted V-shape.

5. The cylinder lifter of claim 1 wherein said frame is comprised of generally horizontal semi-cylindrical bands and generally vertical rods extending from said flat bottom plate, said bands and rods being connected together.

6. The cylinder lifter of claim 5 wherein said bands and rods are connected together by welding.

7. The cylinder lifter of claim 1 wherein said flat bottom plate is adapted to be slipped beneath a bottom surface of a tilted cylinder while said cylinder is passed through the open side of said frame, said cylinder being secured within said frame by sliding said first releasable locking device over the frame and over a top end of said cylinder contained within said semi-cylindrical frame.

8. The cylinder lifter of claim 7 wherein said cylinder is further locked in said frame by extending and securing said second releasable locking device across said open side of frame.

* * * * *